United States Patent
Heitsch

[11] 3,925,467
[45] Dec. 9, 1975

[54] 1,5-DIOXO-2,4,6,8,9,11-HEXAKIS (METHYLIMIDA)-1,5-DIPHOSPHABICYCLO[3,3,3]UNDECANE

[75] Inventor: Charles W. Heitsch, Webster Groves, Mo.

[73] Assignee: Monsanto Company, St. Louis, Mo.

[22] Filed: Oct. 21, 1974

[21] Appl. No.: 516,515

Related U.S. Application Data

[63] Continuation-in-part of Ser. No. 331,935, Feb. 12, 1973, abandoned.

[52] U.S. Cl................................ 260/551 P; 106/15 FP
[51] Int. Cl.² ............................................. C07F 9/44
[58] Field of Search................................ 260/551 P

[56] References Cited
OTHER PUBLICATIONS

"The Chemistry and Uses of Fire Retardants," Lyons, Wiley – Interscience (1970), Chapter 5.

*Primary Examiner*—Daniel E. Wyman
*Assistant Examiner*—Thomas A. Waltz
*Attorney, Agent, or Firm*—William H. Duffey

[57] ABSTRACT

The new compounds of this invention are 1,5-dioxo-2,4,6,8,9,11-hexakis(methylimida)-1,5-diphosphabicyclo[3.3.3]-undecane and hydrates thereof.

They are useful as treating agents for imparting fire retardance to cellulosic materials.

2 Claims, No Drawings

1,5-DIOXO-2,4,6,8,9,11-HEXAKIS (METHYLIMIDA)-1,5-DIPHOSPHABICYCLO[3,3,3]UNDECANE

This is a continuation-in-part of application Ser. No. 331,935 filed Feb. 12, 1973, now abandoned.

This invention relates to a novel phosphorus-nitrogen bicyclic compound having the empirical formula $C_9H_{24}O_2P_2N_6$ and to hydrates thereof.

The anhydrous compound is called 1,5-dioxo-2,4,6,8,9,11-hexakis (methylimida)-1,5-diphosphabicyclo [3.3.3]-undecane (abbreviated as "DHPU"). DHPU is formed when neutral to slightly acidic mixtures of formaldehyde and trimethylphosphorictriamide (abbreviated as "TPA") are prepared 'in aqueous solution. The total reaction is relatively slow at room temperature, requiring several days to reach equilibrium. However, a few minutes at 85°C. is sufficient to reach the same equilibrium. If the solution is concentrated, crystals of DHPU.3H$_2$O will form ($C_9H_{30}O_5P_2N_6$). These can be recovered and recrystallized from acetonitrile in high purity. Sublimation of the trihydrate in vacuum at 185° C. results in dehydration and N$_6$). These can be recovered and recrystallized from acetonitrle in high purity. Sublimation of the trihydrate in vacuum at 185°C. results in dehydration and recovery Formaldehyde used in preparing the novel compounds of this invention was either a 37% aqueous solution or solutions prepared by dissolving para-formaldehyde in distilled water (44 to 47%). The best yields were obtained from the latter.

The TPA reactant employed herein was prepared by a modification of the method of Holmes. The latter is described in *Inorganic Chemistry*, 1,89 (1962) by Robert R. Holmes and James A. Forstner. After adding an excess of dry methylamine to a cold (approximately 25°C.) solution of POCl$_3$ in heptane, the product was extracted with 3 equivalents of aqueous sodium hydroxide, thereby neutralizing the amine hydrochloride. After separation from the heptane, the aqueous solution was concentrated, filtered, concentrated additionally and refiltered to arrive at a solution which was 70% TPA, 7% NaCl, 2 to 5% hydrolysis products of TPA and water. With the exception of precipitates, viz., Na$_4$P$_2$O$_7$ or hydrates thereof, formed by further hydrolysis of the impurities, this solution was stable. Pure, crystalline TPA was obtained by azeotropic drying of the aqueous solution with chloroform followed by filtration to remove salts, concentration and a double crystallization of the solute. Yield of the crude aqueous solution was generally 80 to 90%. A yield as high as 70% was observed for the purification step, affording a product that melted at from 105° to 110°C. This product could be sublimed in vaccum with no apparent improvement in purity.

A typical preparation of the anhydrous compound of this invention, 1,5-dioxo-2,4,6,8,9,11-hexakis (methylimida)-1,5-diphosphabicyclo[3.3.3]-undecane, is set forth in the following example; also the trihydrate.

EXAMPLE 1

200 g. of recrystallized TPA was placed in a 500 cc. round bottom flask with a magnetic stirrer and a thermometer. To this was added 139.1 g. of a 47% aqueous solution of formaldehyde at about 80°C. While the crystals were dissolving the temperature dropped to 66°C. and then increased slowly. The reaction vessel was set in an oil bath at 85°C. and the contents were stirred. Although the pH of the aqueous formaldehyde was initially about 3, it increased to nearly 6 as the crystals dissolved. After about 30 minutes the first crystals formed and after 1 hour the reaction mass had set up as a rigid network of needle-like crystals. This was cooled, stirred with a spatula and filtered on a coarse glass frit. The crystals were washed with a small amount of acetonitrile to which up to 5% methanol had been added and then dewatered in a stream of dry nitrogen. The crude crystals (126.8 g. or 48% yield) were recrystallized in 300 g. boiling acetonitrile. There was recovered 86.6 g., melting over a range from 200°C. to 218°C. This initial precipitate was the trihydrate having the empirical formula $C_9H_{24}O_2P_2N_6.3H_2O$ or $C_9H_{30}O_5P_2N_6$, identified as 1,5-dioxo-2,4,6,8,9,11-hexakis (methylimida)-1,5-diphosphabicyclo[3.3.3]-undecane trihydrate. The yield of the trihydrate was 68% on the recrystallization with an overall yield of 30%.

Analysis: Calc. for $C_9H_{30}O_5P_2N_6$; C = 29.7%, H = 8.3%, P = 17.0%, N = 23.1%, Mol. Wt. = 364, H$_2$O = 14.8%. Found: C = 29.4%, H = 8.1%, P = 17.0%, N = 23.2%, Mol. Wt. (by Osmometry in CH$_3$CN) = 365, H$_2$O (by Photovolt Aquameter) = 14.1%.

The hydrated crystals were then sublimed in vacuum (at about 0.01 mm, and 180°C.) to recover an anhydrous form of different crystal structure than the hydrate. A small non-volatile residue remained and water with a trace of formaldehyde was trapped by liquid nitrogen. The sublimate was analyzed: Calc. for $C_9H_{24}O_2P_2N_6$; C = 34.8%, H = 7.8%, P = 20.0%, N = 27.1%, Mol. Wt. = 310. Found: C = 35.2%, H = 8.1%, P = 19.6%, N = 26.8%, Mol. Wt. (by Osmometry in methanol) = 308; m.p. = 233°–242°C. This sublimate was the anhydrous DHPU compound of the present invention and is believed to have the following structure:

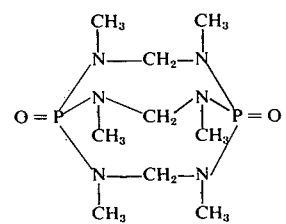

DHPU in both the hydrated and the anhydrous form, is useful as a treating agent for imparting fire retardance to cellulosic materials such as textile fabrics.

The exact manner of treating cellulosic substrates with DHPU is not critical. It is generally desired that the cellulosic material be impregnated with DHPU from an aqueous medium. Although the use of an aqueous medium is preferred, particularly within the textile industry, organic media such as hydrocarbons, alcohols, ethers, amides and the like are sometimes utilized.

According to conventional standards, a flame retardant or flame resistant cellulosic material is one where, although the surface or article may burn when in direct contact with a flame source, the flame will extinguish when the source is removed rather than continue to propagate.

Thus, the amount of DHPU which is applied to the cellulosic substrate must be sufficient to render the substrate flame resistant. As a general rule, about 1.0% or more by weight of phosphorus, based upon the weight of the cellulosic substrate, will render the substrate flame retardant.

In flame retarding a cellulosic substrate with DHPU, the substrate (fabric) is passed through a bath comprising an aqueous solution of DHPU and thereafter cured at a temperature above 100°C., preferably from 120°C. to 200°C. for a period of 1 minute to 1 hour, the latter duration depending upon cure temperature and other variables.

It is usually found desirable to employ a latent acid catalyst in aqueous solution with DHPU. Non-limiting examples of such catalysts are magnesium chloride and 2-amino-2-methylpropanol-1-hydrochloride. The catalyst may be typically present in about 1 percent by weight of the aqueous solution which comprises the bath for treating the cellulosic substrate.

Resin type coreactants are often desirable in conjunction with DHPU. They are typically present in about 5 percent by weight of the bath solution although considerable variation is permissible in this concentration. Non-limiting examples of suitable coreactants include substituted melamines, guanamines and dimethylol cyclic alkylene areas. Suitable substituted melamines include the methylol melamines such as di- and trimethylol melamines and modified methylol melamines such as the trimethyl ether of trimethylol melamine.

What is claimed is:
1. 1,5-dioxo-2,4,6,8,9,11-hexakis (methylimida)-1,5-diphosphabicyclo[3.3.3]-undecane.
2. 1,5-dioxo-2,4,6,8,9,11-hexakis (methylimida)-1,5-diphosphabicyclo[3.3.3]-undecane hydrate.

* * * * *